May 29, 1962

J. TAKACS, JR 3,036,851

CLAMPING DEVICE

Filed March 21, 1960

INVENTOR.
JOHN TAKACS, JR.
BY Hudson, Boughton,
Williams, David Hoffmann
ATTORNEYS May 29, 1962  J. TAKACS, JR  3,036,851
CLAMPING DEVICE
Filed March 21, 1960  2 Sheets-Sheet 2

INVENTOR.
JOHN TAKACS, JR.
BY Hudson Boughton
Williams, David Hoffmann
ATTORNEYS

United States Patent Office 3,036,851
Patented May 29, 1962

3,036,851
CLAMPING DEVICE
John Takacs, Jr., Cleveland, Ohio, assignor to The American Ship Building Company, Cleveland, Ohio, a corporation of New Jersey
Filed Mar. 21, 1960, Ser. No. 16,546
10 Claims. (Cl. 292—256.5)

This invention relates to clamping devices and, more particularly, to a clamping device of the kind used to releasably secure a member to an associated support, the member frequently being a cover and the support frequently being a structure having an opening to be closed by the cover.

This application is related, as to subject matter and through common ownership, to application Serial No. 828,973 filed July 23, 1959.

The clamping device provided by this invention is one which can be used to advantage wherever the member or cover to be secured is subject to frequent removal, and where actuation of the clamping device with minimum manual work and time expenditure is desirable. Although the clamping device of this invention is applicable to numerous different members and forms of covers, it is especially suitable for the hatch covers of ships and other cargo carrying vehicles, and is described hereinafter for such hatch cover use without any intention, however, to limit the invention precisely thereto.

An object of this invention is to provide a clamping device which is of a simple construction comprising a minimum number of parts adapted to be economically produced and readily assembled, and which can be quickly and easily manipulated to its locking and releasing conditions.

To further explain the practical aspect of the clamping device provided by this invention, it is pointed out that the hatch covers of ships and other cargo vehicles are required to be frequently removed from the hatch openings to accommodate the loading and unloading of cargo and, accordingly, considerable manual work is involved in actuating the clamps for such covers to their clamping and releasing positions. Because of its simplicity of construction and ease of operation, the clamping device of the present invention facilitates the performance of this work, and moreover, the device is of a form such that when it is installed on the ship it occupies only a small amount of space and is in an out-of-the-way location for minimum interference and damaging contact therewith, as well as for minimum likelihood of injurious personal contact by bumping thereagainst.

In connection with the present trend toward "containerization" in the handling and shipping of cargo, hatch covers of the so-called "pontoon" type are frequently provided on ships so that the flat top of such covers can be used as a location for additional cargo after the hold has been filled. The clamping device of this invention also has the advantage that, when it is used in conjunction with such a pontoon type of cover and is in its clamping position, all parts of the device lie below the top portion of the cover so that during the placing of such additional cargo on, or removing the same from, the top of the hatch cover there will be little likelihood of damaging engagement with the clamping device.

The clamping device of this invention aims to achieve, and does successfully achieve, the objects and advantages referred to above. Various other objects and advantages of this invention will be apparent in the following detailed description and in the accompanying sheets of drawings forming a part of this specification and in which, FIG. 1 is a top plan view with portions broken away, showing the clamping device of this invention in its clamping condition and being used in conjunction with a pair of cooperating members comprising a hatch cover and an associated support structure or coaming;

Figure 1:
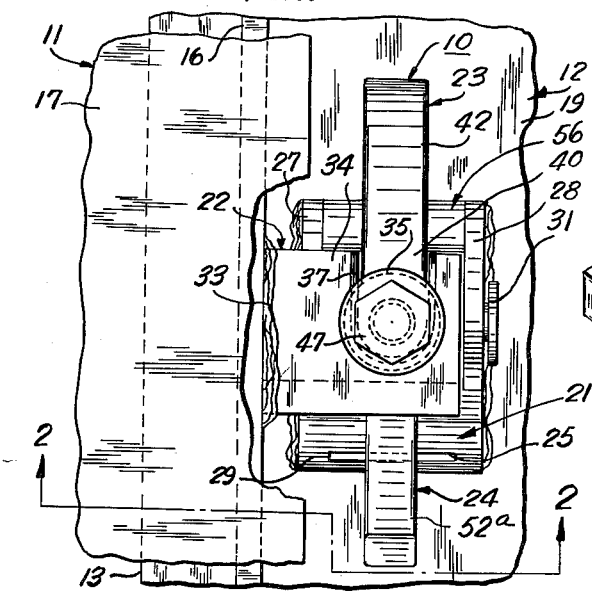
Figure 5:
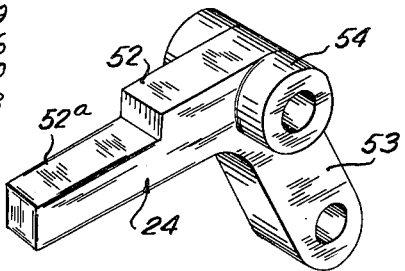
FIG. 5 is a perspective view showing the actuating link of the clamping device in a detached relation.
Figure 2:
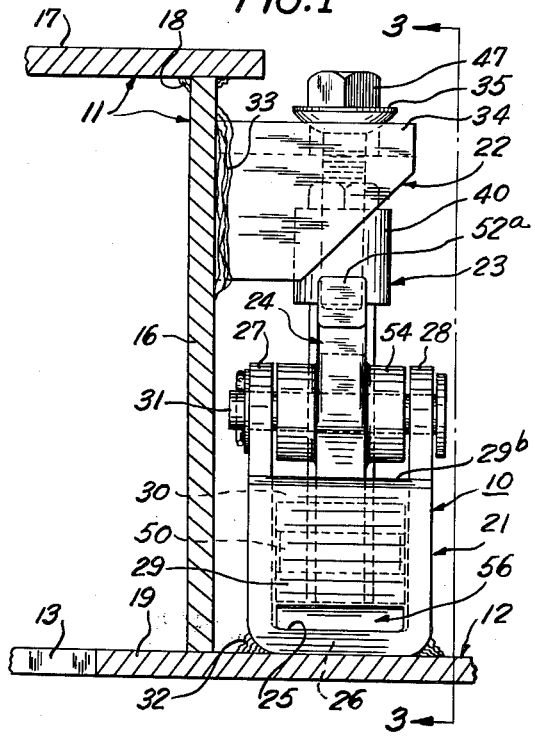
FIG. 2 is a partial vertical section taken through the hatch cover and support structure and showing the clamping device in front elevation, the view being taken on section line 2—2 of FIG. 1.

The novel clamping device 10 of this invention is shown, by way of example, as being used in conjunction with a hatch cover 11 of the above-mentioned pontoon type and provides an efficient clamping means for releasably securing the cover on a support structure 12 for closing a hatch opening 13 of the latter. The cover 11 and the support structure 12 will first be briefly described and the construction and manner of operation of the clamping device 10 will be described later. The clamping device 10 can be used in either a right hand or left hand installed position.

The cover 11 is of a conventional form and may comprise a quadrangular body having upright side walls 16 and a substantially horizontal top wall 17 secured to such side walls as by welds 18. The cover 11 is receivable on the support structure 12 in covering relation to the hatch opening 13, as by resting of the lower portion of the cover on a plate means 19 extending around the hatch opening and which may comprise deck plates of a ship or shelf plates of a coaming or the like. A plurality of the clamping devices 10 are provided and are spaced around the hatch opening 13, the number of clamping devices used being dependent upon the size and needs of the cover 11.

The clamping device 10 comprises, in general, a mounting member or bracket 21, a holding member or keeper 22, and a clamp member 23 connected with the mounting member so as to be swingable to and from a closed or clamping position in engagement with the holding member. The clamping device 10 also includes an actuating means comprising a toggle link member 24 connected between the clamp member 23 and the mounting member 21. The mounting member 21 and the holding member 22 are adapted for attachment to the associated structures with which the clamping device 10 is to be used, in this case the mounting member being shown on the support structure 12 and the holding member 22 on the cover structure 11.

The mounting member 21 is shown as comprising a hollow bracket having an end or bottom wall 26, a pair of spaced side walls 27 and 28, and a front wall or web 29 connected with and bridging the space between the side walls for a portion of the height of the bracket. The space between the side walls 27 and 28 provides a chamber 30 into which portions of the actuating link 24 and the clamp member 23 are movable to a retracted or housed position, as will be explained hereinafter. The side walls 27 and 28 form a support for a pivot pin 31 which extends transversely of the bracket adjacent the upper or outer end thereof. The bracket 21 is disposed with the end wall 26 thereof seating against the plate means 19 of the support structure 12 to which the bracket is suitably attached as by means of weld connections 32. The lower portion of the front wall 29 is preferably provided with a drainage opening 25 for the escape of water or the like from the chamber 30.

The holding member or keeper 22 is here shown as being an angle-shaped clip which is suitably secured to the cover 11 as by means of weld material 33. The holding member 22 is preferably located on the cover 11 at a point below the top plate 17 thereof and is here shown as being attached to one of the upright side walls 16 and projecting laterally therefrom. One of the legs of the angle-shaped clip forming the holding member 22 is disposed in a position, usually a horizontal position as shown in the drawings, to provide a first thrust means 34 with which a second thrust means 35 of the clamp member 23 co-operates when the clamp member is actuated to its closed and clamping position as explained hereinafter. The thrust means 34 is shown as being of a forked shape and having a slot 36 extending thereinto and provided with a bevelled edge 37.

The clamp member 23 comprises a C-shaped body having upper and lower ends 40 and 41 and an intermediate portion 42 connecting such ends. The upper end 40 is provided with a threaded opening 43 and the thrust means 35 is shown as being a screw having a threaded stem 44 adjustably received in the threaded opening and secured at the desired setting by a lock nut 45. The stem 44 extends in a projecting relation from the end 40 and carries a head 47 for clamping co-operation with the holding member 22 and which head is provided on the underside thereof with a bevelled or spherical portion 48 for seating engagement with the bevelled edge 37 of the thrust means 34.

The lower end 41 of the clamp member 23 is here shown as being a forked end having a recess 49 therein in which a portion of the actuating link 24 is received. The forked end 41 carries a transverse pivot pin 50 by which this end of the clamp member is pivotally connected with the link 24.

The actuating link 24 comprises a bell crank lever having angularly disposed actuating and connecting arms 52 and 53. The link 24 is supported in the bracket 21 by having the intermediate portion 54 thereof received between the spaced side walls 27 and 28 of the bracket and pivotally mounted on the pin 31. The connecting arm 53 extends in a generally downward direction from the pivot pin 31 and supports or partially supports, the clamp member 23. The actuating arm 52 projects from the bracket 21 on the front side thereof in a transverse relation to the front wall 29. The outer or free end 52ª of the arm 52 is of a size and shape for the application of a suitable actuating tool or wrench thereto for manipulation of the clamping device 10.

The bracket 21 is open on the rear side thereof so as to provide an access opening for entry of the end 41 of the clamp member 23 into the bracket recess 30, and the clamping device 10 is provided with a fulcrum means 56 with which the end 41 co-operates during such entry movement. The fulcrum means 56 is effective between the bracket 21 and the clamp member 23 for causing an automatic swinging of the thrust means 35 into co-operating engagement with the thrust means 34 of the holding member 22 in response to manual actuating movement of the link 24.

The fulcrum means 56 provided for this purpose is here shown as comprising a projection 56ª on the end wall 26 of the bracket 21 so as to extend transversely of the recess 30 and is located therein at a point just inwardly of the rear access opening thereof. The fulcrum projection 56ª is provided with a convex or semicylindrical bearing portion 56ᵇ at the top thereof which is rockably and slidably engaged by a surface portion 58, preferably a straight or flat surface portion, of the clamp member 23. The surface portion 58 is on the outer or bottom peripheral portion of the clamp member 23 and is located on or adjacent the end portion 41 thereof.

Figure 3:
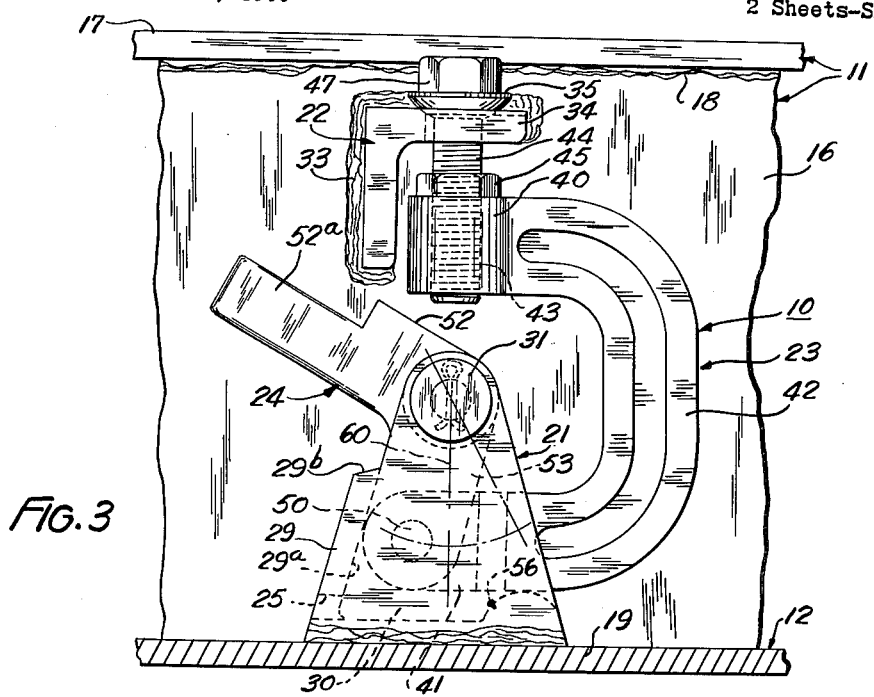
FIG. 3 is a side elevation of the clamping device and of portions of the associated cover and support structure when viewed as indicated by the directional line 3—3 of FIG. 2, the clamping device being shown in its closed or clamping condition.
Figure 4:
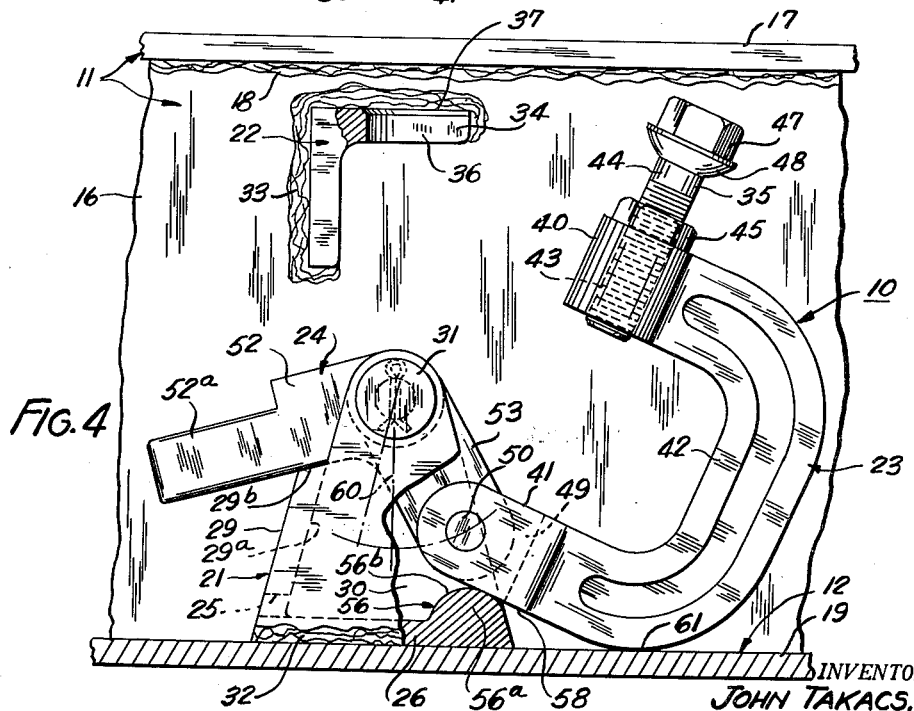
FIG. 4 is a side elevation similar to that of FIG. 2 but showing the clamping device in its open or released condition.

When the clamping device 10 is in its open or released condition shown in FIG. 4, the pivot pin 50 lies on one side of a median line 60 of the bracket 21 which extends through the axis of the pivot pin 31 but, when the device is actuated to its closed or clamping position shown in FIG. 3, the pivot pin 50 lies on the opposite side of the median line 60. When the clamping device 10 is in the open condition referred to just above, the clamp member 23 may be partially supported by engagement of the curved portion 61 thereof with the surface of the plate means 19 as shown in FIG. 4.

When the actuating link 24 is swung in a clockwise direction by the application of a lifting force to the arm 52 thereof, the connecting arm 53 will move into the bracket recess 30 thereby pulling the end 41 of the clamp member 23 into the bracket recess also. This movement of the end 41 into the bracket recess 30 will take place as a rocking and sliding movement of the surface portion 58 on the fulcrum projection 56ª whereby the clamp member will be lifted by the fulcrumming action and, at the same time, will be swung on the pivot pin 50 to cause the thrust means 35 to approach the holding member 22 and enter the slot 36 of the latter.

Continued swinging of the link 24 in the clockwise direction causes the pivot pin 50 to move across the median line 60 to thereby produce a toggle-link action by which the clamp member 23 is moved to its fully-closed and clamped position shown in FIG. 3. By the time that the clamp member 23 is moved to its fully closed position shown in FIG. 3, either the end 41 thereof or the connecting arm 53 of the link 24, or both, will come into engagement with the adjacent rear surface 29ª of the front bracket wall 29 as a stop means and the end 41 will remain in this position as long as the clamping device 10 is left in its clamping condition.

When the link 24 is swung in a counterclockwise direction by an actuating force applied to the arm 52, the connecting arm 53 swings outwardly of the bracket recess 30 to cause a combined sliding and rocking movement of the surface portion 58 on the fulcrum projection 56ª whereby the clamp member 23 swings away from the holding member 22 and drops by gravity action to the open position shown in FIG. 4. This counterclockwise movement of the link 24 brings the lower edge of the arm 52 into engagement with a bevelled-edge stop portion 29ᵇ on the top of the front wall 29 to thereby limit the extent of clamp-releasing movement of the link.

The clamp member 23 is so constructed that by reason of its C-shape referred to above, it will have a limited flexibility during the actuation thereof to clamping and releasing positions by the toggle link 24. The significance of this limited flexibility of the clamp member 23 will be recognized from the fact that when the pivot pin 50 crosses the median line 60 in either direction it is at the lowermost point of its arc of travel and, since the thrust means 35 is then in engagement with the thrust means 34 of the holding member 22, the clamp member will be expanded somewhat in response to the downward thrust applied to the end 41 by the arm 53. The position of the link 24 with the arm 53 thereof in engagement with the stop 29ª can therefore be referred to as the locking position of this link.

When the clamping device 10 is being actuated to its closed and clamping position by the movement of the pivot pin 50 toward the left away from the median line 60, the expansive action of the clamp member 23 co-operates with the link 24 in producing a toggle action by which the clamping device is retained in its locked condition shown in FIG. 3. On the other hand, when the pivot pin 50 moves toward the right away from the median line 60 during the releasing and opening actuation of the clamping device 10, the expansive action of the clamp member 23 assists in producing the toggle action to cause an unlocking of the clamping device. The position of the link 24 with the arm 52 thereof in engagement with the stop 29b can therefore be referred to as the unlocking position of this link. It will be recognized that for the structural form of the clamp member 23 and the operating positions thereof, as shown in FIGS. 3 and 4, the approximate center of gravity thereof will always lie on the right side of the median line 60 and outside of the chamber of the bracket 21.

From the accompanying drawings and the foregoing detailed description it will now be readily understood that this invention provides a clamping device of a simple and practical construction which can be readily manufactured and installed and which will function in a highly satisfactory manner as a quick-action device for securing a movable member, such as a hatch cover or the like, on a support structure. It will now also be recognized that this novel clamping device comprises only a small number of parts capable of being economically produced and assembled and provides for easy locking and unlocking movements which can be rapidly carried out. Such ease and rapidity, with which this clamping device can be actuated to its clamping and releasing positions, is of considerable importance in connection with the hatches of cargo ships whose hatch covers are large and cumbersome and require the use of a large number of clamping devices. It will now also be recognized that the clamping device of this invention occupies only a very small amount of space so as to cause only a minimum amount of obstruction of the deck areas at the sides of the support structure and, moreover, all portions of the clamping device lie below the top surface of the hatch cover so as to permit free use of such surface for supporting cargo containers or the like thereon, as well as an unobstructed stacking of the covers upon each other when they are removed from the hatches.

Although the clamping device of this invention has been illustrated and described herein to a somewhat detailed extent, it will be understood, of course, that the invention is not to be regarded as being limited correspondingly in scope but includes all changes and modifications coming within the terms of the claims hereof.

Having described by invention, I claim:

1. A clamping device for releasably connecting a movable cover structure with a support structure comprising; first thrust means adapted to be attached to said cover structure; a hollow bracket adapted to be attached to said support structure; said bracket containing a recess and having an access opening in one side thereof in communication with said recess; pivot means on said bracket adjacent the upper portion of said recess; said first thrust means and bracket having cooperative positions in a spaced relation along a substantially vertical median line extending through the axis of said pivot means; a movable clamp member having an upper portion carrying a second thrust means and a lower arm portion having a free end receivable in said recess through said access opening; fulcrum means on said bracket and engaged by the underside of said arm portion for rocking of said clamp member on said fulcrum means; and an actuating member mounted on said pivot means and having a flexible operating connection with said arm portion; said operating connection being movable inwardly and outwardly relative to said recess in a lateral direction and transversely of said median line to locking and unlocking positions on opposite sides of the latter; said clamp member being rockable on said fulcrum means in a direction opposed to gravity action to clampingly engage said second thrust means with said first thrust means in response to movement of said operating connection to said locking position, and said clamp member being rockable on said fulcrum means in a direction assisted by gravity to disengage said second thrust means from said first thrust means in response to movement of said operating connection to said unlocking position.

2. A clamping device as defined in claim 1 wherein said actuating member comprises a bell crank lever having an actuating arm projecting from said bracket and a connecting arm swingably movable in said recess and operatively connected with said arm portion of the clamp member.

3. A clamping device as defined in claim 1 wherein said clamp member comprises a substantially C-shaped body of limited flexibility and whose approximate center of gravity is located on the side of said fulcrum means remote from said recess when said operating connection is in said unlocking position.

4. A clamping device as defined in claim 1 and comprising stop means on said bracket at the side of said recess opposite said access opening and engageable by said free end when said operating connection is in said locking position.

5. A clamping device as defined in claim 1 wherein said fulcrum means is convex and said underside of said arm portion is substantially flat for a combined rocking and sliding movement on the fulcrum means.

6. A clamping device as defined in claim 1 wherein one of said first and second thrust means comprises a forked portion having a slot extending thereinto, and the other thrust means comprises head means of a headed stem receivable in said slot.

7. A clamping device for releasably connecting a movable cover structure with a support structure comprising; first thrust means adapted to be attached to said cover structure in a laterally projecting relation thereto; an upright hollow bracket having a base portion adapted to be attached to said support structure; said bracket containing a recess and having an access opening in one side thereof in communication with said recess; pivot means on said bracket adjacent the upper end thereof; said first thrust means and said bracket having co-operative positions in a spaced relation along a substantially vertical median line extending through the axis of said pivot means when said closure structure is received on said support structure; a movable clamp member comprising a substantially C-shaped body having an upper end portion and also having a lower arm portion extending into said recess through said access opening; a second thrust means on said upper end portion; fulcrum means on the base portion of said bracket adjacent said access opening and rockably and slidably engaged by the underside of said arm portion; an actuating member comprising a bell crank lever swingable on said pivot means; said lever having a connecting arm pivotally connected with said arm portion by a second pivot means, and an actuating arm projecting from said bracket for the application of an actuating force thereto; said second pivot means being movable inwardly and outwardly relative to said recess in a lateral direction and transversely of said median line to locking and unlocking positions on opposite sides of the latter; said clamp member being rockable on said fulcrum means in a direction opposed to gravity action to clampingly engage said second thrust means with said first thrust means in response to movement of said second pivot means to said locking position, and said clamp member being rockable on said fulcrum means in a direction assisted by gravity to disengage said second thrust means from said first thrust means in response to movement of said second pivot means to said unlocking position.

8. A clamping device as defined in claim 7 wherein said bracket has stop means thereon engageable by said actuating arm upon movement of said second pivot means to said unlocking position.

9. A clamping device as defined in claim 7 wherein said bracket has stop means thereon including a first stop portion engageable by said arm portion upon movement of said second pivot means to said locking position, and a second stop portion engageable by said actuating arm upon movement of said second pivot means to said unlocking position.

10. A clamping device as defined in claim 9 wherein said bracket includes a front wall having said first and second stop portions thereon; said front wall having a drainage opening therein for drainage of liquid from said chamber.

References Cited in the file of this patent

UNITED STATES PATENTS

| | | |
|---|---|---|
| 1,698,928 | Wentorf | Jan. 15, 1929 |
| 2,538,385 | Schurman | Jan. 16, 1951 |
| 2,583,053 | Kestner et al. | Jan. 22, 1952 |
| 2,791,455 | Greer et al. | May 7, 1957 |